United States Patent [19]

Budish

[11] 4,111,532
[45] Sep. 5, 1978

[54] TEMPORARY SIDE VIEW MIRROR FOR COVERING A VEHICULAR MIRROR

[76] Inventor: Joseph D. Budish, 1635 Madison Ave., South Milwaukee, Wis. 53172

[21] Appl. No.: 812,917

[22] Filed: Jul. 5, 1977

Related U.S. Application Data

[63] Continuation-in-part of Ser. No. 805,450, Jun. 10, 1977, abandoned.

[51] Int. Cl.$^2$ .......................... G02B 5/08; A47G 1/24
[52] U.S. Cl. ...................................... 350/307; 248/481
[58] Field of Search ...................... 350/307, 302–304; 248/481–484

[56] References Cited

U.S. PATENT DOCUMENTS

| | | | |
|---|---|---|---|
| 3,048,084 | 8/1962 | Iannuzzi | 350/304 |
| 3,790,117 | 2/1974 | Winkler | 350/304 |

FOREIGN PATENT DOCUMENTS

| | | | |
|---|---|---|---|
| 1,245,951 | 9/1971 | United Kingdom | 350/307 |
| 1,202,646 | 8/1970 | United Kingdom | 350/307 |
| 1,322,787 | 7/1973 | United Kingdom | 350/307 |

*Primary Examiner*—Jon W. Henry
*Attorney, Agent, or Firm*—Michael, Best & Friedrich

[57] ABSTRACT

A temporary rear view mirror which is adapted for removable mounting on existing side view mirrors of the type including a mirror pivotally mounted inside a housing supported on the exterior of a vehicle. The temporary mirror includes a casing arranged to fit over and at least partially enclose the housing of the existing side view mirror and a mirror pivotally supported on the outer end of an arm extending laterally outwardly from one side of the casing. In one embodiment, the casing is securely held in place by two pairs of laterally spaced arms depending from the lower edges of the front and rear walls of the casing and a bolt which connects each pair of arms and can be tightened to clamp the casing onto the housing of the existing rear view mirror. In another embodiment, the casing is secured in place by two adjustably mounted plate members disposed inside the casing, one of which is movable into clamping engagement with the rear portion of the housing of the existing rear view mirror and the other of which is movable into clamping engagement with a side portion of the housing of the existing mirror. In a further embodiment, the casing is comprised of two separable sections including means for clamping them together for securing the casing onto the housing of the existing side view mirror.

10 Claims, 7 Drawing Figures

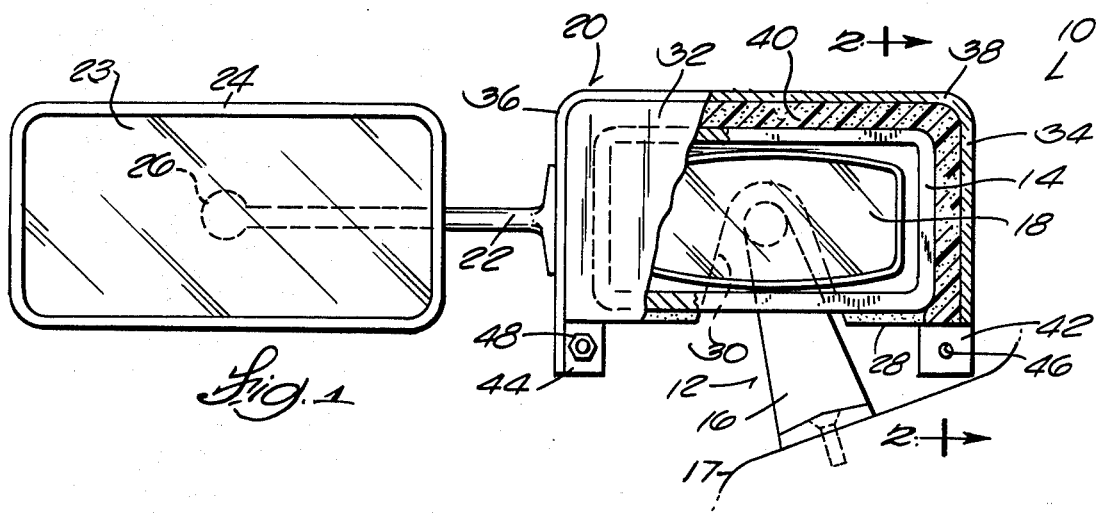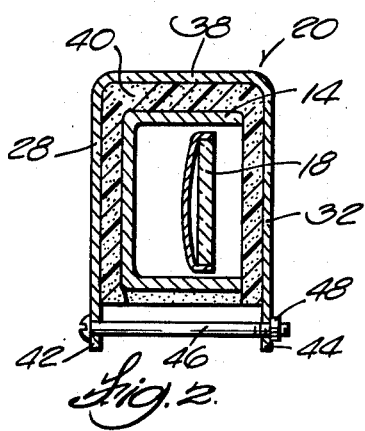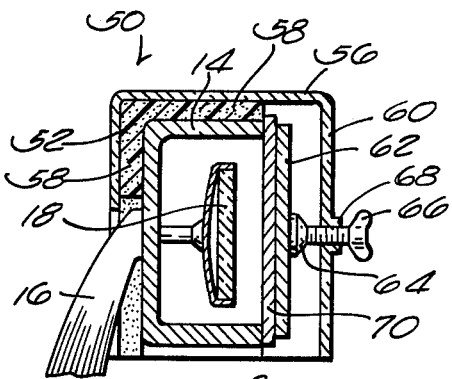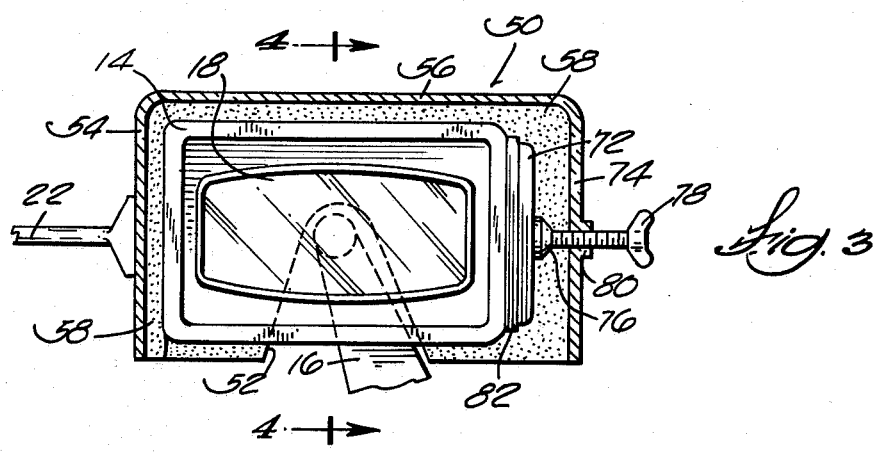

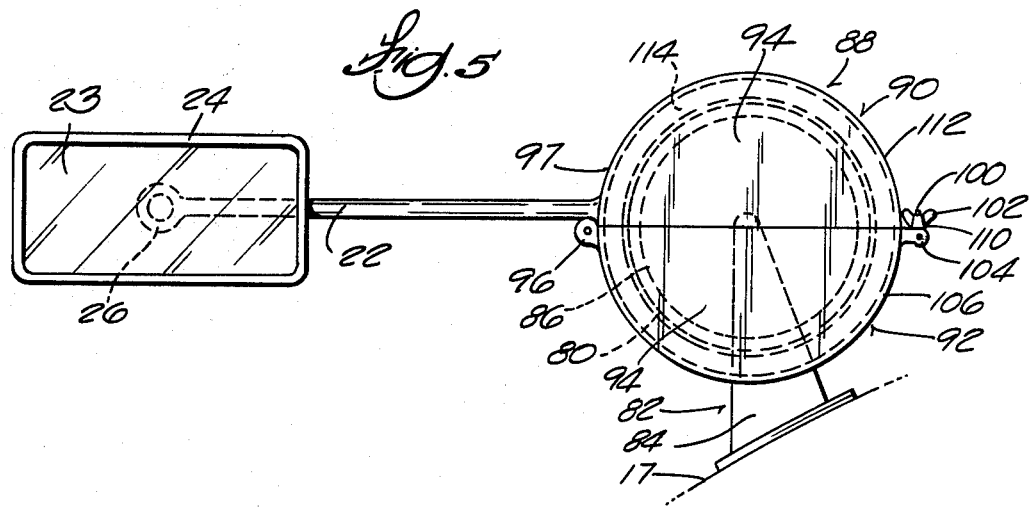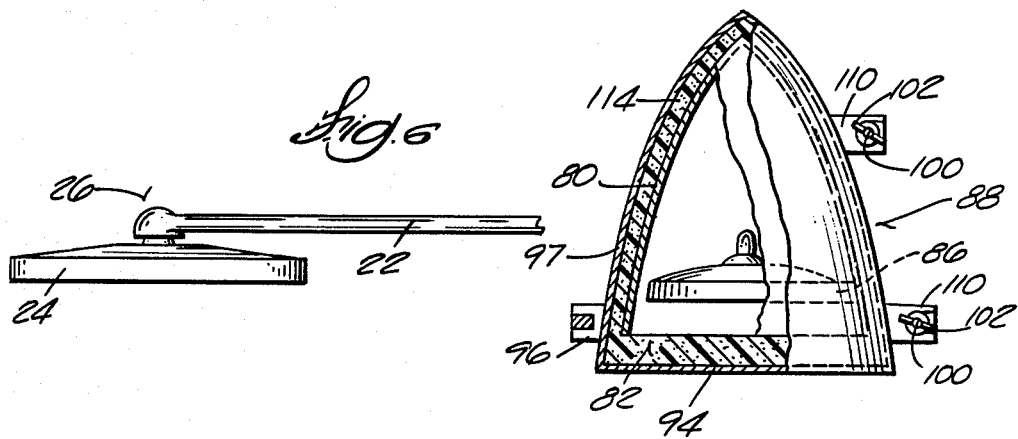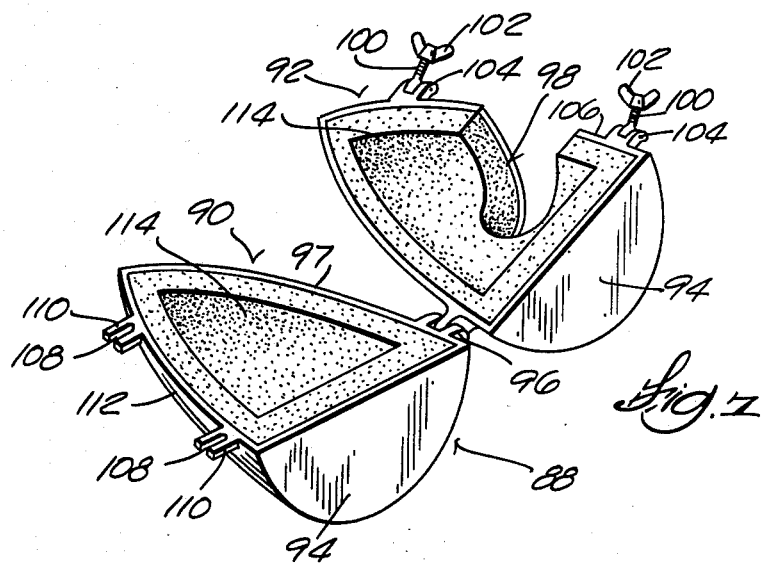

TEMPORARY SIDE VIEW MIRROR FOR COVERING A VEHICULAR MIRROR

CROSS-REFERENCE TO RELATED APPLICATIONS

This application is a continuation-in-part of Ser. No. 805,450, filed June 10, 1977 now abandoned.

BACKGROUND OF THE INVENTION

The invention relates to side view mirrors for vehicles and, more particularly, to temporary side view mirrors for use with motor vehicles when wide loads are being towed thereby.

When a wide load such as a trailer, boat and the like is being towed by an automobile, the existing side view mirrors included as part of the standard equipment on most modern automobiles cannot be adjusted to provide the driver with a view of the roadway behind or alongside the load. Temporary side view mirrors which extend further outwardly from the side of the car are commonly used for these purposes. The most widely used temporary side view mirrors are removably mounted onto the front fenders or onto the front door frame of the automobile.

In addition to the oftentimes troublesome installation required, special care must be exercised to prevent scratching of the paint in the areas where the mounting clamps are installed. Also, when the driver glances at the temporary side view mirror while driving, his attention can be momentarily distracted by the existing side view mirror, particularly when the temporary mirror is attached on the front door.

British Pat. No. 1,322,787 discloses a mirror which is adapted for temporary installation on existing side view mirror assemblies of the type where the mirror is centrally pivotally mounted on a support which is affixed on the body of the automobile. The mirror portion of the temporary mirror disclosed in that patent is an integral part of the attachment mechanism which is arranged to abut the opposite edges of the mirror. Thus, adjustment of the temporary mirror is dependent upon movement of the existing mirror.

In many modern side view mirror constructions, the mirror is mounted for independent pivotal movement inside a housing which is affixed to the body of the automobile. Such housings have a wide variety of sizes and shapes. Consequently, the temporary mirror disclosed in the above-identified British patent cannot be effectively used with side view mirrors having such a construction.

SUMMARY OF THE INVENTION

One of the principal objects of the invention is to provide a temporary side view mirror for motor vehicles which can be removably mounted on existing side view mirror assemblies of the type where the mirror is pivotally mounted inside a stationary housing and can be conveniently adjusted, independently of the existing side view mirror, to provide the desired field of vision.

Another principal object of the invention is to provide such a temporary side view mirror which is arranged to completely cover the mirror portion of the existing side view mirror assembly so as to eliminate possible distractions to the driver while looking at the temporary mirror.

A further principal object of the invention is to provide such a temporary side view mirror which can be easily and readily adjusted to permit safe and secure mounting on existing side view mirror assemblies of varying sizes and shapes.

A still further principal object of the invention is to provide such a temporary side view mirror which, although relatively simple and inexpensive to fabricate, assemble and install, is durable and sturdy in construction.

Other objects, aspects and advantages of the invention will become apparent to those skilled in the art upon reviewing the following description, the drawing and the appended claims.

The temporary side view mirror provided by the invention is adapted for mounting on the housing of an existing side view mirror having a mirror pivotally mounted inside the housing which is supported on the exterior of a vehicle. The temporary side view mirror includes a casing which fits over and at least partially encloses the housing of the existing side view mirror and means for securing the casing onto the housing. The casing has opposed inner and outer side walls and a rear wall for covering the existing side view mirror. A mirror pivotally mounted on the outer end portion of an arm extending laterally outwardly from the outer side wall of the casing affords the driver with a selectively adjustable view alongside and behind a load being towed by the vehicle.

In one embodiment, the casing includes a front wall and is arranged to be slipped down over the housing of the existing side view mirror in a substantially interference fit. In another embodiment, the casing is securely held in place on the housing by two pair of opposed arms depending from the lower edges of the casing front and rear walls and means connecting each pair of arms for adjustably moving the arms towards each other and thereby moving the front and rear walls of the casing into clamping engagement with the housing. In another embodiment, the casing is secured in place on the housing by one or more plate members mounted inside the casing for adjustable clamping engagement with the rear portion and/or a side portion of the housing. In a further embodiment, the casing includes two separable sections which are clamped together to secure the casing on the housing.

BRIEF DESCRIPTION OF THE DRAWINGS

FIG. 1 is a rear elevational view, partially broken away, of a temporary side view mirror embodying various of the features of the invention, shown installed on an existing side view mirror located on the driver side of an automobile.

FIG. 2 is a sectional view taken along the line 2—2 in FIG. 1.

FIG. 3 is a fragmentary, rear elevational view, partially broken away, of an alternate construction for the temporary side view mirror.

FIG. 4 is a sectional view taken along the line 4—4 in FIG. 3.

FIG. 5 is a rear elevational view, similar to FIG. 1, of another alternate construction of the temporary side view mirror which is particularly adaptable for installing on existing side view mirrors having a torpedo-like shaped housing.

FIG. 6 is a fragmentary top plan view, partially broken away, of the temporary side view mirror in FIG. 5.

FIG. 7 is a perspective view of the casing of the temporary side view mirror in FIG. 5, shown with the separable casing sections in a position ready for installation onto an existing side view mirror.

DESCRIPTION OF THE PREFERRED EMBODIMENTS

Referring to FIGS. 1 and 2, a temporary side view mirror 10 embodying the invention is shown mounted on a conventional automobile side view mirror 12 including a stationary housing 14 supported on a support post 16 which is suitably secured to the front door panel 17 of the automobile and a flat mirror 18 mounted inside the housing 14 in a conventional manner for relative pivotal movement to adjust the field of vision alongside and behind the automobile. In the specific conventional side view mirror 12 illustrated in FIGS. 1-4, the mirror 18 is rectangular and the housing 14 has a rectangular shape. However, it should be understood that the temporary side view mirror 10 provided by the invention can be adapted for use in conventional side view mirrors having housings of various sizes and shapes, including pyramidal shapes, torpedo-like shapes, etc.

The temporary side view mirror 10 includes a casing 20 which fits down over and at least partially encloses the housing 14 of the existing rear view mirror 12, a rigid arm 22 extending laterally outwardly from one side of the casing 20 and a flat, rectangular glass mirror 23 held in a back plate 24 which is pivotally mounted on the outer end of the arm 22 in a suitable manner for adjusting the field of vision, such as by a conventional universal ball and socket arrangement 26 (not shown in detail). Thus, the mirror 23 is located at a position spaced outwardly from the conventional side view mirror 18 where it can be adjusted to provide the driver with a view alongside and behind a load being towed by the vehicle, such as a boat, a trailer, and the like.

The temporary side view mirror 10 is shown mounted on a side view mirror assembly located on the driver side of the vehicle. Most modern automobiles have side view mirrors on both the driver and passenger side, in which case a temporary side view mirror can be used on both sides of the vehicle. As will be appreciated from the following description, various of the components for a temporary side view mirror mounted on the passenger side are located 180° from their location for a temporary side view mirror mounted on the driver side.

The casing 20 includes a front wall 28 having a generally central opening 30 which is arranged to accommodate the support post 16, a rear wall 32 which completely covers the rear portion of the housing 14, and thus the mirror 18, of the existing side view mirror 12, and opposed inner and outer side walls 34 and 36. To minimize the accumulation of snow, ice, dust, etc., inside the casing 20 and to enhance the overall esthetic appearance of the unit, the casing 20 preferably also includes a top wall 38. If desired, a separate bottom (not shown), which is adapted to snap into the bottom portion of the casing 20 after installation thereof on the side rear view mirror housing 14, can be provided.

In some existing side view mirror constructions, particularly those frequently used on sport models having a housing with a torpedo-like shape, the support post is situated beneath the mirror housing. For such constructions, the opening 30 can be omitted from the casing front wall 28 and the separate bottom (if used) is provided with an open-ended, laterally extending slot for accommodating the support post.

Means are provided for securing the casing 20 onto the side view mirror housing 14. For many conventional side view mirror assemblies, particularly those with housings having a generally rectangular shape, the interior of the casing 20 can be dimensioned to approximate the size and shape of the housing 14 and preferably is lined with a relatively resilient, non-scratching material 40, such as a foamed synthetic rubber or plastic (e.g., styrofoam) so that the casing fits over the housing with a substantially interference fit. In FIGS. 1 and 2, the clearance between the interior of the casing 20 and the mirror assembly housing 14 has been exaggerated for the purpose of illustration.

With such an arrangement, it often is possible for the temporary side view mirror 10 to be held securely in place on the housing 14 without further securing means. However, in order to compensate for manufacturing tolerance, for wear to the lining material 40 from repeated use, etc., means preferably are provided for clamping the casing 20 onto the housing 14.

In the embodiment illustrated in FIGS. 1 and 2, such clamping means includes two pairs of laterally spaced arms 42 and 44 depending from the lower edges of the casing front wall 28 and rear wall 32, respectively, a bolt 46 extending through coaxial apertures provided in the arms 42 and 44, and a nut 48 threaded onto one end of the bolt 46 projecting rearwardly from the arm 44. After the casing 22 is slipped down over the housing 14, the nuts 48 are tightened to flex the rear and front walls of the casing into clamping engagement with the rear and front portions of the housing via the lining material 40.

In the embodiment illustrated in FIGS. 3 and 4, adjustable clamping means are provided for securing the casing onto the existing side view mirror housing so that the temporary mirrors having a casing of one size and shape can be conveniently mounted on side view mirrors having housings of varying sizes and shapes. More specifically, the casing 50 is dimensioned so that the interior is somewhat larger than the exterior dimensions of the largest side mirror housing 14 on which the temporary side view mirror is to be installed. The inner surfaces of the front wall 52, the outer side wall 54 and the top wall 56 of the casing 50 are lined with a relatively resilient, non-scratching material 58.

Disposed inside the casing 50 adjacent the rear wall 60 is a plate member 62 which is arranged to overlie the rear edge portion of the side view mirror housing 14 outside of the mirror 18 (FIG. 4). The plate member 62 is pivotally supported, such as by a conventional ball and socket arrangement 64, on the inner end of a thumb screw 66 threadably mounted in an external boss 68 provided on the rear wall 60. After the casing 50 has been installed over the side view mirror housing 14, the thumb screw 66 is tightened and the plate member 62 is thereby moved into clamping engagement with the rear edge portion of the housing surrounding the mirror 18 as shown in FIG. 4. A pad 70 of resilient, non-scratching material, such as rubber or the like, preferably is provided on the inner face of the plate member 62 so as to minimize scratching of the housing and accommodate surface irregularities.

To provide further clamping, another plate member 72 can be provided inside the casing 50 adjacent either the inner wall 74 or the outer wall 54. The plate member 72 preferably is located adjacent the inner wall as shown in FIG. 3 so it can be conveniently adjusted as required from inside the vehicle. The plate member 72 is arranged and functions in substantially the same manner as the plate member 62. The plate member 72 is adapted to engage the inner side portion of the housing 14 and is pivotally supported, such as by a conventional ball and socket arrangement 76, on the inner end of a thumb screw 78 threadably mounted in an external boss 80 provided on the inner wall 74 of the casing 50. A pad 82 of relatively resilient, non-scratching material preferably is provided on the inner face of the plate member 72.

For installation of the auxiliary side view mirror 10 when both plate members are provided, the thumb screws 66 and 78 are loosened until the corresponding plate members 62 and 72 are retracted to a position where the casing can be slipped down over the housing 14. The thumb screw 66 is tightened to move the pad 70 on the plate member 62 into engagement with the rear edge of the housing 14 and pull the lining material 58 on the casing front wall 52 into loose engagement with the front portion of the housing 14, i.e., the casing 50 still can be moved laterally relative to the housing. The thumb screw 72 is then tightened to move the pad 82 on the plate member 72 into engagement with the inner side portion of the housing and pull the lining material 58 on the casing outer side wall 54 into clamping engagement with the outer side portion of the housing 14. The thumb screws 66 and 78 are thereafter tightened as required to firmly clamp the casing 50 onto the housing 14. Of course, the thumb screws can be tightened in the reverse order.

In the embodiment illustrated in FIGS. 5-7, the housing 80 of the existing side view mirror 82 has a torpedo-like shape and is fixedly supported on a support post 84 which is generally situated beneath the housing 80 and is suitably secured on the front door panel 17 of the automobile. A generally flat, circular mirror 86 is pivotally mounted inside the housing 80.

The casing 88 includes separable upper and lower sections 90 and 92 having a torpedo-like shape resembling the mirror housing 80. In the specific construction illustrated, each casing section 90 and 92 is arranged to enclose approximately one-half of the mirror housing 80 and includes a rear wall portion 94 which covers approximately one-half of the rear portion of the mirror housing 80. While the casing sections 90 and 92 can be completely separate parts, they preferably are hinged together at 96 as shown to minimize the possibility of one casing section being misplaced during storage.

The arm 22 carrying the temporary mirror 23 is rigidly affixed on the outer side wall 97 of the upper casing section 90. The lower casing section 92 includes an open-ended, laterally extending slot 98 which is arranged to receive the support post 84 of the existing side view mirror so that the lower casing section 92, with the casing sections separated as shown in FIG. 7, can be slipped sideways into place beneath the mirror housing 80.

After the lower casing section 92 has been moved into place, the upper casing section 90 is swung into place over the top portion of the mirror housing 80 and the two casing sections are clamped together to secure the casing 88 onto the mirror housing 80. In the specific construction illustrated, such clamping means includes a pair of threaded T-bolts or studs 100, each of which includes a wing nut 102 threaded onto the outer end and, at the inner end, is pivotally mounted in a laterally outwardly extending flange or ear 104 provided on the inner side wall 106 of the lower casing section 92. Each of the studs 100 fits into a slot 108 of a corresponding laterally outwardly extending flange or ear 110 provided on the inner side wall 112 of the upper casing section 90 and the wing nuts 102 are tightened to clamp the two casing sections onto the mirror housing 80.

The interior surface of the casing sections 90 and 92 preferably is dimensioned to provide a tight fit with the mirror housing 80 when the casing sections are clamped together. The casing sections 90 and 92 can be lined with a relatively resilient, non-scratching material 114 for the same purpose described above.

If the casing sections are formed as completely separate parts, the hinged connection 96 is replaced by one or more pair of ears similar to the ears 104 and 110. It can be appreciated that the separable casing sections 90 and 92 can be arranged to fit side view mirror housings having a variety of shapes other than the torpedo-like shape illustrated in FIGS. 5-7, including those having a rectangular shape as illustrated in FIGS. 1-4. Of course, the casing sections are provided with an appropriately dimensioned slot for accommodating the support post of the existing side view mirror. Also, the separable casing sections can be arranged to be clamped together in a generally side-by-side relationship in which case they are provided with a slot which is arranged to accommodate the support post in a manner so each can be installed sideways onto the mirror housing.

The casing can be fabricated from various relatively rigid materials having sufficient structural integrity to withstand the loads imposed thereon by the laterally extending mirror 23 during vehicle operation. For example, it can be stamped from a sheet metal or molded from a thermoplastic polymeric composition.

From the foregoing description, one skilled in the art can easily ascertain the essential characteristics of this invention and, without departing from the spirit and scope thereof, can make various changes and modifications to adapt it to various existing side view mirror constructions.

I claim:

1. A temporary side view mirror adapted for mounting on an existing vehicular side view mirror of the type having a mirror pivotally mounted inside a stationary housing supported on the exterior of the vehicle comprising:

a casing arranged to fit over and at least partially enclose the housing of the existing side view mirror, said casing having opposed inner and outer side walls and a rear wall for covering the mirror portion of the existing side view mirror;

an arm extending laterally outwardly from said casing outer side wall and having an outer end portion spaced outwardly from the existing side view mirror;

a mirror having a rear reflective surface and pivotally mounted on the outer end portion of said arm for affording a selectively adjustable field of view alongside and behind a load being towed by the vehicle; and means for securing said casing onto the housing of the existing side view mirror.

2. A temporary side view mirror according to claim 1 wherein:

said casing includes a front wall adapted to engage the front portion of the housing of the existing side view mirror; and said securing means comprises at least two pairs of opposed arms depending from the lower edges of said casing front and rear walls in laterally spaced relationship, and means connecting each pair of said arms for adjustably moving said arms toward each other and thereby moving said front and rear walls of said casing into clamping engagment with the front and rear portions of the side view mirror housing.

3. A temporary side view mirror according to claim 2 wherein said connecting means comprises a bolt extending between each pair of said arms and having a threaded portion projecting through one of said arms and a nut disposed on said threaded portion for engaging said one of said arms upon being tightened.

4. A temporary side view mirror according to claim 1 wherein said casing walls are lined with a relatively resilient, non-scratching material having an interior surface arranged to provide a substantially interference fit with the housing of the existing side view mirror housing when said casing is mounted thereon.

5. A temporary side view mirror according to claim 1 wherein
said casing includes a front wall adapted to engage the front portion of the housing of the existing side view mirror; and
said securing means includes
a first plate member disposed inside said casing adjacent said rear wall and adapted to engage the rear portion of the housing of the existing side view mirror outside the mirror mounted therein, and
means carried by said casing rear wall and supporting said first plate member for selectively moving said first plate member into clamping engagement with the front portion of the housing of the existing side view mirror.

6. A temporary side view mirror according to claim 5 wherein said securing means further includes:
a second plate member disposed inside said casing adjacent one of said inner and outer side walls and adapted to engage a side portion of the housing of the existing side view mirror; and
means carried by said one of said inner and outer side walls and supporting said second plate member for selectively moving said second plate member into clamping engagement with the inner side portion of the housing of the existing side view mirror.

7. A temporary side view mirror according to claim 6 wherein:
said second plate member is located adjacent said casing inner side wall; and
said last-mentioned means is carried by said inner side wall.

8. A temporary side view mirror according to claim 1 wherein:
said casing includes a pair of separable sections, each adapted to fit over a portion of the housing of the existing side view mirror and to cooperate with each other, when moved together, to substantially enclose the housing of the existing side view mirror,
said arm being mounted on one of said casing sections, and
means on said casing sections for clamping said casing sections together so as to clampingly engage the housing of the existing side view mirror and thereby secure said casing on the housing of the existing side view mirror.

9. A temporary side view mirror according to claim 8 wherein at least one of said casing sections includes an open ended, laterally extending slot for receiving the support of the existing side view mirror.

10. A temporary side view mirror according to claim 9 wherein said casing sections are hinged together at one side.

* * * * *